(12) United States Patent
Murdoch et al.

(10) Patent No.: US 6,348,082 B1
(45) Date of Patent: Feb. 19, 2002

(54) GAS FRACTIONALIZATION SYSTEM AND ASSOCIATED METHOD

(75) Inventors: Robert W. Murdoch, Woodstock, GA (US); Valery Kravets, Holland; Scott Banks, Ivyland, both of PA (US)

(73) Assignee: Respironics, Inc., Pittsburgh, PA (US)

( * ) Notice: Subject to any disclaimer, the term of this patent is extended or adjusted under 35 U.S.C. 154(b) by 0 days.

(21) Appl. No.: 09/569,487

(22) Filed: May 11, 2000

Related U.S. Application Data

(60) Provisional application No. 60/134,365, filed on May 14, 1999.

(51) Int. Cl.[7] ............................................. B01D 53/053
(52) U.S. Cl. ................. 95/22; 95/23; 95/130; 96/113; 96/130
(58) Field of Search ............. 95/12, 19, 22, 95/23, 130, 138; 96/110, 113, 114, 130

(56) References Cited

U.S. PATENT DOCUMENTS

| | | | | |
|---|---|---|---|---|
| 3,659,399 A | * | 5/1972 | Kauer, Jr. et al. | 96/113 X |
| 4,168,149 A | * | 9/1979 | Armond et al. | 96/113 X |
| 4,197,096 A | * | 4/1980 | Sebastian et al. | 96/110 |
| 4,472,177 A | * | 9/1984 | Sircar | 95/19 X |
| 4,561,287 A | * | 12/1985 | Rowland | 73/23 |
| 4,648,888 A | * | 3/1987 | Rowland | 95/22 X |
| 4,685,941 A | * | 8/1987 | Sato | 96/114 |
| 4,717,396 A | * | 1/1988 | Stengle et al. | 55/20 |
| 4,806,132 A | * | 2/1989 | Campbell | 55/16 |
| 4,822,384 A | * | 4/1989 | Kato et al. | 96/113 X |
| 4,846,850 A | * | 7/1989 | Webb | 55/21 |
| 4,857,082 A | * | 8/1989 | DiMartino, Sr. et al. | 55/16 |
| 4,995,889 A | * | 2/1991 | Abel et al. | 55/21 |
| 5,183,483 A | * | 2/1993 | Servido et al. | 55/26 |
| 5,258,056 A | * | 11/1993 | Shirley et al. | 95/22 |
| 5,474,595 A | * | 12/1995 | McCombs | 95/23 |
| 5,496,388 A | * | 3/1996 | Tellier | 55/210 |
| 5,593,478 A | * | 1/1997 | Hill et al. | 96/111 |
| 5,746,806 A | * | 5/1998 | Aylsworth et al. | 95/8 |
| 5,876,485 A | * | 3/1999 | Andreani | 95/23 |
| 5,893,944 A | * | 4/1999 | Dong | 96/114 |
| 5,906,672 A | * | 5/1999 | Michaels et al. | 95/12 |
| 5,917,135 A | * | 6/1999 | Michaels et al. | 95/11 |
| 6,063,169 A | * | 5/2000 | Cramer et al. | 96/112 |
| 6,077,331 A | * | 6/2000 | Phillips | 95/12 |

* cited by examiner

*Primary Examiner*—Robert H. Spitzer
(74) *Attorney, Agent, or Firm*—Michael W. Haas

(57) ABSTRACT

A gas fractionalization system including a compressor for receiving air from the ambient environment and producing a flow of pressurized air, a gas separation system for producing a concentrated gas portion from the pressurized air, a valve for controlling duration during which the compressed air is delivered to the gas separation system during a pressurization cycle, and a product chamber for receiving concentrated gas produced by the gas separation system. The gas fractionalization system includes a control system that itself includes a pressure sensor for sensing the occurrence of high and low pressures within the product chamber, a processing system that determines the pressure ratio of the high and low gas pressure within the product chamber, and a valve controller that manipulates the valve, and, hence, the duration in which the flow of pressurized air is presented to the gas separation chamber based on the pressure ratio.

15 Claims, 1 Drawing Sheet

GAS FRACTIONALIZATION SYSTEM AND ASSOCIATED METHOD

CROSS-REFERENCE TO RELATED APPLICATIONS

This application claims priority under 35 U.S.C. § 119(e) from provisional U.S. patent application no. 60/134,365 filed May 14, 1999.

BACKGROUND OF THE INVENTION

1. Field of the Invention

This invention pertains to an apparatus and method for separating gas mixtures by a pressure swing absorption system, and relates, more particularly, to the regulation of the work done by a compressor in moving a consumable gas to the absorption apparatus depending on the gas consumed by an end user by varying the valve timing that regulates the passage of pressurized air from the compressor to the absorption apparatus.

2. Description of the Related Art

Gas fractionalization systems are used for separating a desired gas from a gas mixture, such as air. A typical gas fractionalization system is an oxygen concentrator, which separates oxygen from air for subsequent inhalation by a patient. An oxygen concentrator, or similar pressure swing absorption system, typically includes molecular sieve beds for separating the gas into an oxygen and a nitrogen fraction, whereby the oxygen is subsequently provided to the patient while the nitrogen is retained in the sieve bed and subsequently purged. Generally, in a gas fractionalization system, two sieve beds are utilized. One sieve bed separates nitrogen from the oxygen while the other sieve bed is simultaneously being purged of the nitrogen previously absorbed during the prior separation cycle.

Typically, oxygen concentrators utilize a compressor that draws air from the ambient environment and presents the air to the molecular sieves for separation of the gases. A flow control device located between the molecular sieves and the patient controls the amount of oxygen delivered to the patient. Typically, an oxygen concentrator can provide a flow of oxygen ranging from 1 liter per minute to 5 liters per minute. A typical oxygen concentrator is illustrated in U.S. Pat. No. 5,183,483 the contents of which are incorporated herein by reference.

Even though oxygen concentrators are designed to provide an oxygen flow rate between 1 to 5 liters per minute, these concentrators are typically operated at less than full capacity and typically are operated to provide only 2 liters of oxygen per minute. While these oxygen concentrators may provide various flow outputs of oxygen, such systems are generally not designed to provide a varying input flow of air into the molecular sieves. Accordingly, the compressors of these systems continuously operate at one work level, which is that level required to produce the maximum flow of oxygen, e.g., 5 liters per minute. The result is that in a typical operation setting, e.g., 3 liters per minute, the compressor is needlessly working harder than required to produce the desired flow of oxygen selected by the patient. The drawbacks of the compressor working harder than necessary are that the compressor at full capacity is noisier than required and also utilizes more power than required. Thus, it is desirable to reduce the work of the compressor when the desired flow rate from the oxygen concentrator is less than the maximum flow rate that the concentrator can provide.

U.S. Pat. No. 4,561,287 ("the '287 patent") discloses an oxygen concentrator system that automatically controls the valve timing to regulate the flow of pressurized air from a compressor into the molecular sieves. This is accomplished in the '287 patent by monitoring the pressure levels within the product chamber and using the detected pressure to directly determine patient utilization, such as the flow of concentrated gas to the patient from the product chamber. However, the system taught by the '287 patent has difficulty determining patient utilization, and, hence, accurately controlling the valve timing, because the measured pressure levels in the product chamber vary for reasons other than patient utilization. In particular, the present inventors noted that the pressure in the product chamber is a function of the valve pressurization time. Because different pressurization times for the molecular sieves result in different pressures within the product chamber, a system, such as that taught by the '287 patent, which determines patient utilization directly from the pressure in the product chamber, will incorrectly determine that patient utilization has changed if the pressurization time has changed, even though the actual patient utilization remains unchanged. For these reasons, it is difficult, if not impossible, to control the valve timing in a reliable and stable manner based directly on the measured pressure in the product chamber. From the above-described problems with conventional oxygen concentrations systems, the present inventors determined that what was needed was a control system and method of interpreting the product chamber pressure is independent of the valve pressurization time to determine patient utilization.

SUMMARY OF THE INVENTION

Accordingly, it is an object of the present invention to provide a pressure swing absorption system wherein the operation of the compressor is modified to correspond with the desired output of the product gas resulting in a reduction in the power requirements of the compressor and that does not suffer from the disadvantages associated with conventional pressure swing absorption systems.

Furthermore, it is an object of the present invention to provide a gas fractionalization system having control system in which a parameter indicative of the flow rate of the product gas is utilized to vary the valve timing for communicating pressurized air flow from the compressor to the molecular sieve chambers, thereby reducing the power consumption of the system and providing a more tranquil operating environment.

These objects are accomplished according to the principles of the present invention by providing a gas fractionalization system having a control system for regulating the flow of pressurized air flow from the compressor to the molecular sieve chambers based on a ratio of pressures in the product chamber. More specifically, the gas fractionalization system of the present invention includes a compressor for receiving air from the ambient environment, a gas separation chamber for producing a concentrated gas portion from the air, a valve for presenting compressed air to the gas separation chamber at a duration of a pressurization time, and a product chamber for receiving concentrated gas from said gas separation chamber. The control system includes a pressure sensor for sensing the high and low gas pressures within the product chamber. A processor determines the pressure ratio of the high and low gas pressure within the product chamber, and a valve controller manipulates the valve to provide compressed air to said gas separation chamber at a pressurization time corresponding to the pressure ratio.

It is a further object of the present invention to provide a method of varying a valve cycle time to reduce the power requirements of a compressor in a pressure swing absorption system that does not suffer from the disadvantages associated with conventional pressure swing absorption systems. This object is achieved by providing a method that includes 1) determining a high pressure level of gas within a product chamber of a gas fractionalization system, 2) determining a low pressure level of gas within the product chamber, 3) calculating a pressure ratio of the high pressure mark versus the low pressure, and 4) manipulating a position of a valve that controls delivery of pressurized gas from a compressor to a gas separation system in such a gas fractionalization system based on the pressure ratio for controlling presentation of pressurized gas to the gas separation system during a charging phase.

These and other objects, features and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

The figure is a schematic view of a pressure swing absorption, i.e., gas fractionalization system, for regulating a multi-positional valve depending on the usage of product gas by the patient according to the principles of the present invention.

DETAILED DESCRIPTION OF THE PRESENTLY PREFERRED EMBODIMENTS OF THE INVENTION

Figure 1:
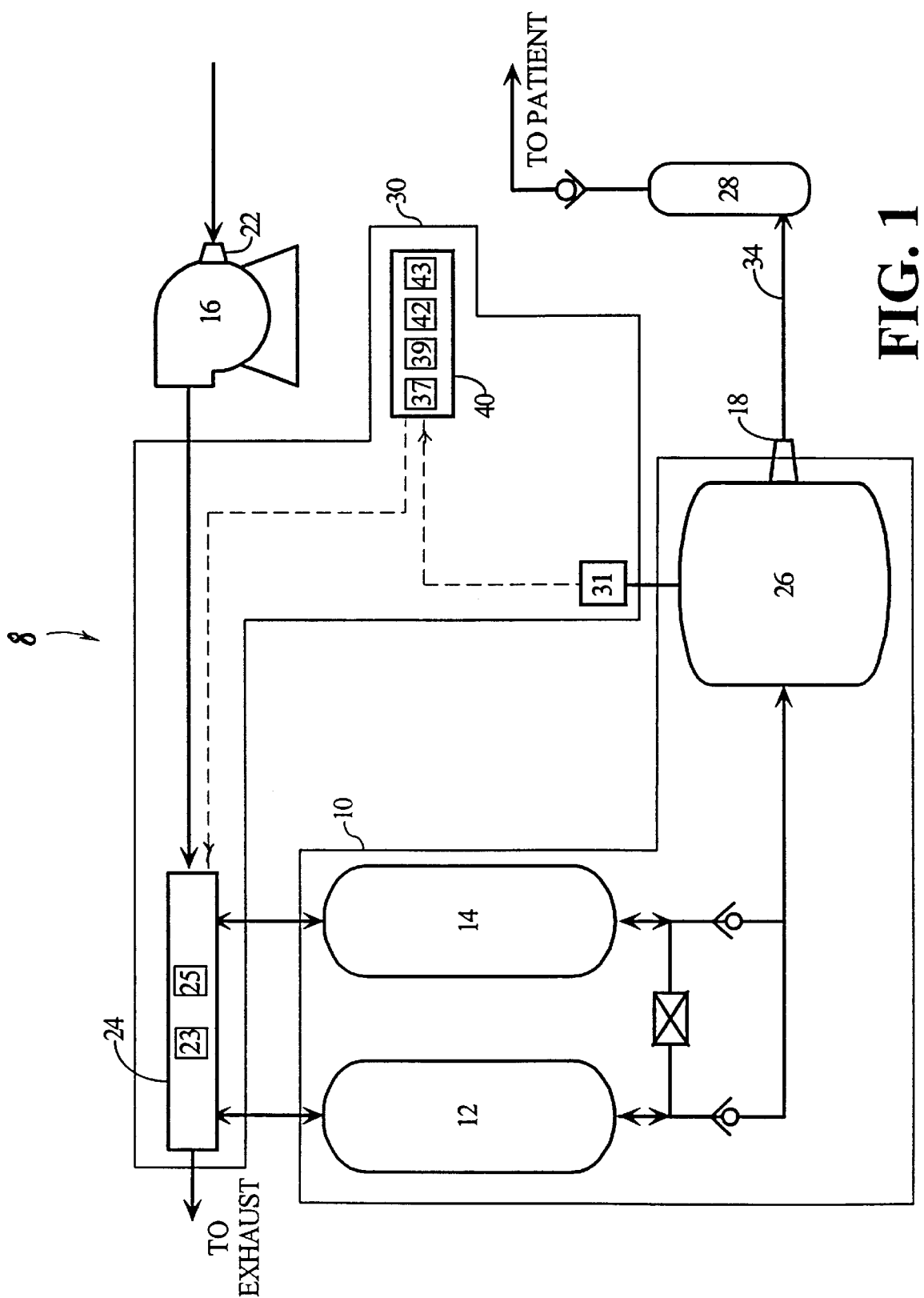

The functioning of gas fractionalization systems are well known, and a fully detailed description of such can be found in U.S. Pat. No. 5,183,483, entitled "Pneumatic Circuit Control for Pressure Swing Adsorption Systems" the contents of which are incorporated herein by reference. For clarification purposes, only a general description of a gas fractionalization system will be discussed herein. As shown in the figure, gas fractionalization system 8 includes a molecular sieve housing 10, which houses a pair of molecular sieves 12 and 14, a compressor 16 for introducing pressurized air to the molecular sieves, and a gas outlet 18 enabling concentrated gas to exit molecular sieve housing 10 to be presented to a patient. Gas fractionalization system 8 is preferably an oxygen concentrator that utilizes molecular sieves 12 and 14 to fractionate air drawn from the ambient environment by compressor 16 to produce concentrated oxygen for delivery to a patient at a determinable flow rate.

Compressor 16 includes a compressor inlet 22 through which air is drawn and subsequently presented through respective valving and conduits to a valve system 24. Valve system 24 includes a valve 23 and a valve controller 25 for regulating the passage of pressurized air to molecular sieves 12 and 14. As is typical with a pressure swing adsorption system, valve controller 25 controls valve 23 such that valve 23 cycles between presenting pressurized air to a first molecular sieve 12 for producing concentrated oxygen while enabling the purging of waste by-product gas from a second molecular sieve 14 that was produced from a previous operation of producing concentrated oxygen and, thereafter, presenting pressurized air to second molecular sieve 14 for producing concentrated oxygen while enabling the purging of waste by-product gas from first molecular sieve 12. The oxygen product from molecular sieves 12 and 14 is subsequently transferred from a charging molecular sieve to a product chamber 26 for subsequent inhalation by a patient. A variable flow valve 28 is manipulated by a patient to control the amount of oxygen product delivered to the patient. The variable flow valve is typically designed so that a flow rate between one to five liters of oxygen product is delivered to the patient per minute. Of course other flows may be provided.

A control system 30 monitors the flow of oxygen delivered to the patient. Control system 30 includes a pressure sensor 31 that senses the pressure within product chamber 26. By monitoring pressure changes within product chamber 26, the present invention determines a parameter that is indicative of or that models the flow rate of oxygen actually being utilized by the patient. The parameter indicative of the oxygen flow rate to the patient is preferably based on a derivative of the pressure change within the respective molecular sieves. More specifically, in a preferred embodiment of the present invention, the ratio between a high pressure level and a pressure level occurring within the product chamber during one operating cycle, a portion of an operating cycle, or that occur in the product chamber over a plurality of operating cycles is used as the parameter that correlates to the actual oxygen flow rate delivered to the patient.

For present purposes, one operating cycle of a pressure swing absorption system includes four phases during which a valve, such as valve 23, controls the flow of pressurized gas into a pair of molecular sieves, such as sieves 12 and 14. Phase one consists of the pressurization of first molecular sieve 12 and the simultaneous purging of second molecular sieve 14. Phase two is a pressure equalization phase wherein the pressure is equalized between both molecular sieves. Phase three consists of the pressurization of second molecular sieve 14 and the simultaneous purging of first molecular sieve 12. Phase four is another pressure equalization phase where the pressure is equalized between both molecular sieves. The time period required to pressurize a respective sieve is referred to as the pressurization time. The complete time to accomplish all four phases is known as the valve cycle time.

The power consumption of the compressor is directly related to the valve cycle time. By reducing the charging time of the respective molecular sieve beds, less power is consumed in operating the compressor. In addition, the compressor also does less work, because less air is presented to the molecular sieves. The present invention contemplates manipulating the valve system in order to regulate the airflow into the respective molecular sieves so that only enough pressurized air is delivered to the molecular sieves needed to produce the quantity of concentrated oxygen demanded, i.e., set, by the patient. To accomplish this function, in a preferred embodiment, the parameter indicative of the flow of concentrated gas drawn from the product chamber by an end user is transmitted from sensor 31 to a processing system 40.

Processing system 40 is a standard processor having various components including, but not limited to a memory 37 and a processor 39. Processing system 40 also includes a look up table 42, which is stored in memory and which includes data for manipulating the valve system such that only the airflow required to produce the desired oxygen flow rate at a sufficient concentration level is allowed to pass into the respective molecular sieve. Look up table 42 utilizes the pressure chamber high pressure versus low pressure ratio as an input and produces as an output, the respective valve cycle time needed to produce that respective flow.

To calculate the high pressure versus low pressure ratio in the product chamber during one operating cycle, a portion of an operating cycle, or over a plurality of operating cycles, a pressure signal is sent from pressure sensor 31 to processing system 40 and stored in memory 37. In a preferred embodiment of the present invention, the pressure signal is substantially continuously sent by sensor 31 during the pressurization stages of the respective sieves. For instance, if the valve has a pressurization time of 6.25 seconds and the data clock transmits a clock signal at a rate of sixteen signals per second, then one hundred pressure signal data points are sent to memory 37 of processing system 40. The value of the pressure signal is processed and compared with prior pressure signals to determine the highest and lowest pressure levels occurring in the product chamber in the time period of interest that have previously been stored in memory.

In a preferred exemplary embodiment of the present invention, the ratio between the high pressure levels and the low pressure levels within the product chamber during half of the operating cycle is used as a parameter that correlates to the oxygen flow rate delivered to the patient. A half operating cycle includes the pressurization of one of the molecular sieves, as well as the purging of the other sieve, (phase one or three), and the balancing of the pressure between the two sieves (phase two or four). Thus, in this embodiment, the pressure ratio is calculated at the end of each balancing phase. Hence, during one complete cycle of charging and purging the respective molecular sieves, two pressure ratios are calculated.

The present invention contemplates that the pressure variations that take place during the pressurization phase alone (phase one or phase three) can be used to determine the ratio between the high pressure level and the low pressure level within the product chamber, which is then used as a parameter that correlates to the oxygen flow rate delivered to the patient. However, the pressure in the product chamber is also preferably monitored during the pressure balancing phase to provide a complete review of all pressure levels during the half operating cycle.

Tests conducted by the applicant demonstrate that a correlation exists between the ratio of the high pressure level and the low pressure level in the product chamber during one of the above intervals, such as the half or complete operating cycle, and the actual flow of oxygen demanded by, i.e., delivered to, the patient. For example, when the patient demands 1.6 liters per minute, i.e., when the flow rate of oxygen to the patient is set at 1.6 liters per minute, the ratio of the high pressure level versus the low pressure level in the product chamber over a half operating cycle is approximately 1.175. The ratio between the high pressure level and the low pressure level is between 1.18 and 1.260 when the patient withdraws between 1.6 and 2.6 liters per minute. Furthermore, the ratio of the high pressure level versus the low pressure level is between 1.265 and 1.320 when the patient demands between 2.6 and 3.6 liters per minute. Additionally, the ratio of the high pressure level versus the lower pressure level is equal to or greater than 1.325 when the patient demands more than 3.6 liters per minute.

In one embodiment, the respective pressurization times for the molecular sieves are manipulated under the following look up table 42:

| Pressurization time (sec.) | Step Down Ratio | Step Up Ratio | Move To Top |
| --- | --- | --- | --- |
| 6.25 | 1.32 | n/a | n/a |
| 5.5 | 1.26 | 1.325 | 1.325 |
| 4.5 | 1.175 | 1.265 | 1.325 |
| 3.25 | n/a | 1.180 | 1.325 |

In this embodiment, for example, if the patient demands between 5.0 to 3.6 liters per minute of oxygen, the ratio is 1.325 or higher. Consequently, the pressurization, or charging time, of the respective molecular sieves is set to 6.25 seconds. Likewise, if the patient demands between 3.6 to 2.6 liters per minute of oxygen, the ratio is between 1.32 and 1.26. Consequently, the pressurization of the respective molecular sieves is set to 5.5 seconds. Of course, it would tie obvious to one skilled in the art that a look up table may include a significant number of data points for controlling the cycling of the valve system.

The "move to the top" ratio value is utilized if a substantial increase is noticed in the pressure ratios in the product chamber, which would indicate a rapid withdrawal of oxygen by the patient. Consequently, it is preferred that the gas fractionalization system be adjusted to provide the maximum quantity of concentrated gas.

Additionally, a ratio index counter 43 is utilized for identifying an occurrence of a pressure ratio above or below a ratio trigger level. If more than a predetermined number of occurrences occur above or below a threshold pressure level, then it is determined that the cycle time should be adjusted to a higher or lower trigger level. This ratio index counter is utilized to prevent the frequent oscillation between cycle times merely due to signal noise or some other anomaly. If the ratio index counter reaches the predetermined number of occurrences, then it is presumed that the actual usage of the user has actually changed to another demand level. In the preferred embodiment, that predetermined number of occurrences is six.

Furthermore, it is desired that a certain level of oxygen purity be produced by the gas fractionalization system. Consequently, the respective pressurization times are set in order to produce the desired level of oxygen purity at the patient demand level. In the preferred embodiment, the desired oxygen purity level for four liters or less per minute of concentrated gas be 94%±2% and 92%±4% at a maximum rate of output of five liters per minute. The aforementioned pressurization times produce this result.

Accordingly, in operation, valve system 24 is initially operated at the highest pressurization time for initially charging the molecular sieves. Subsequently, during operation of the gas fractionalization system, the amount of product gas demanded by the patient is measured by the control system, whereby the pressure within the product chamber is relayed to the processing system. The processing system stores the high pressure value and low pressure value and calculates the ratio between the two. The processing system also updates the index counter to identify an occurrence of the respective ratio between a certain range. If, for example, more than six consistent occurrences have occurred, then the pressurization time will either be adjusted or maintained depending on the past six events. The adjustment of the valve cycle time is accomplished by processing system sending a corresponding timing signal to valve controller 25.

Tests demonstrate that when the present invention is practiced, up to a ten percent reduction in wattage is achieved. Furthermore, the work required by the compressor for compressing a small volume of ail enables the compressor to a longer operating life due to less work required.

Thus, an advantageous design for an oxygen concentrator is provided according to the present invention by monitoring the delivery of concentrated gas to a patient based on the pressure measured in the product chamber at one location, but at different stages in the pressurization cycle to determine a ratio of high and low pressures. The present invention varies the pressurization time of the molecular sieves based on the amount of concentrated gas demanded by the patient as determined according to this ratio of pressures.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims.

What is claimed is:

1. A method for varying a valve cycle time in a gas fractionalization system comprising:

determining a high pressure level of gas within a product chamber of a gas fractionalization system;

determining a low pressure level of gas within the product chamber;

calculating a pressure ratio of the high pressure level versus the low pressure level; and manipulating a position of a valve that controls delivery of pressurized gas from a compressor to a gas separation system in such a gas fractionalization system based on the pressure ratio for controlling presentation of pressurized gas to the gas separation system during a charging phase.

2. The method of claim 1, further including:

providing a data table having a set of pressure ratios and corresponding valve pressurization times; and using the data table to correlate the pressure ratio to a valve pressurization time during which the manipulating step causes the valve to deliver pressurized gas from the compressor to the gas separation system.

3. The method of claim 1, further including identifying an occurrence of a pressure ratio being within a predetermined range.

4. The method of claim 3, further including delaying the manipulation of the positioning of said valve until the occurrences of the pressure ratios being within the predetermined range exceed a predetermined number.

5. The method of claim 1, wherein the pressure ratio is calculated in the calculating step based on the high pressure level and the low pressure level occurring within the product chamber during one operating cycle of the gas separation system.

6. The method of claim 1, wherein the pressure ratio is calculated in the calculating step based on the high pressure level and the low pressure level occurring within the product chamber during half an operating cycle of the gas separation system.

7. A gas fractionalization system comprising:

a compressor having an inlet adapted to receive air from an ambient environment to generate a flow of pressurized air;

a gas separation system operatively coupled to the compressor to receive the flow of pressurized air and produce an amount of a concentrated gas therefrom during a separation cycle;

a product chamber operatively coupled to an output of the gas separation system to receive the concentrated gas from the gas separation system; and a control system comprising:

a pressure sensor coupled to the product chamber to sense pressure levels within the product chamber and output a pressure signal indicative thereof, a processing system operatively coupled to the pressure sensor, wherein the processing system determines a pressure ratio of a high pressure versus a low pressure in the product chamber occurring during operation of the gas fractionalization system based on the pressure signal and outputs a command signal based on the pressure ratio, and a valve disposed between the compressor and the gas separation system for controlling a duration during which the flow of pressurized air is presented to the gas separation system;

a valve controller for manipulating the valve based on the command signal to control the duration in which the pressurized air is presented to the gas separation system based on the pressure ratio.

8. The system of claim 7, wherein the processing system includes a ratio index counter that identifies an occurrence of a pressure ratio being at least one of 1) above a first ratio trigger level and 2) below a second ratio trigger level, wherein the processing system monitors a number of occurrences where the pressure ratio is one of 1) above the first ratio trigger level and 2) below the second ratio trigger level.

9. The system of claim 7, wherein the processing system determines a pressure ratio as the high pressure versus the low pressure measured over one operating cycle of the gas separation system.

10. The system of claim 7, wherein the processing system determines a pressure ratio as the high pressure versus the low pressure measured over half an operating cycle of the gas separation system.

11. The system of claim 7, wherein the processing system includes a look up table stored in memory that correlates the pressure ratio to a pressurization time for the gas separation system, and wherein the command signal output by the processing system corresponds to a pressurization time determined from the detected pressure ratio using the look up table.

12. A gas fractionalization system comprising:

compressor means for generating a flow of pressurized air;

gas separating means for producing a concentrated gas from the flow of pressurized air during a concentrated gas generation cycle;

holding means for storing the concentrated gas from the gas separating means; and a control system comprising:

pressure sensing means for sensing gas pressure within the holding means including a high pressure level and a low pressure level occurring within the holding means during operation of the gas fractionalization system, ratio calculating means for calculating a pressure ratio of the high pressure level and the low pressure level during operation of the gas fractionalization system, flow controlling means for controlling a duration during which the flow of pressurized air is presented from the compressor means to the gas separating means, and processing means having memory provided with a pressurization time for charging said gas separating means corresponding to said pressure ratio within said holding means, and wherein said processing means regulates said flow controlling means according to said pressurization time.

13. The system of claim 12, wherein the ratio calculating means calculates the pressure ratio of the high pressure level and the low pressure level occurring within the holding means during one operating cycle of the gas separation system.

14. The system of claim 12, wherein the ratio calculating means calculates the pressure ratio of the high pressure level and the low pressure level occurring within the holding means during half an operating cycle of the gas separation system.

15. The system of claims 12, wherein the control system further comprises:
    means for identifying an occurrence of a pressure ratio being at least one of 1) above a first ratio trigger level and 2) below a second ratio trigger level; and
    means for monitoring a number of occurrences where the pressure ratio is one of 1) above the first ratio trigger level and 2) below the second ratio trigger level.

\* \* \* \* \*